United States Patent
Mao et al.

(10) Patent No.: US 10,082,895 B2
(45) Date of Patent: *Sep. 25, 2018

(54) CAPACITIVE STYLUS AND TOUCH CONTROL APPARATUS APPLYING SYNCHRONIZED TIME DIFFERENCE SIGNAL TRANSMITTING METHOD

(71) Applicant: WALTOP INTERNATIONAL CORPORATION, Hsinchu (TW)

(72) Inventors: Chung-Fuu Mao, Hsinchu (TW); Chia-Jui Yeh, Taipei (TW)

(73) Assignee: Waltop International Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,670

(22) Filed: Jan. 5, 2017

(65) Prior Publication Data

US 2018/0120959 A1    May 3, 2018

(30) Foreign Application Priority Data

Oct. 28, 2016    (TW) .............................. 105135147 A

(51) Int. Cl.
*G06F 3/045*    (2006.01)
*G06F 3/038*    (2013.01)
*G06F 3/044*    (2006.01)
*G06F 3/0354*   (2013.01)
*G06F 3/041*    (2006.01)

(52) U.S. Cl.
CPC ........ *G06F 3/0383* (2013.01); *G06F 3/03545* (2013.01); *G06F 3/044* (2013.01); *G06F 3/0418* (2013.01); *G06F 2203/0384* (2013.01); *G06F 2203/04104* (2013.01)

(58) Field of Classification Search
CPC ...... G06F 3/0383; G06F 3/044; G06F 3/0317; G06F 3/03545; G06F 3/0416; G06F 3/0418; G06F 2203/0384; G06F 2203/04104

See application file for complete search history.

(56) References Cited

U.S. PATENT DOCUMENTS

| | | | | |
|---|---|---|---|---|
| 8,773,405 | B1 * | 7/2014 | Ryshtun | G06F 3/03545 178/19.03 |
| 8,797,301 | B2 * | 8/2014 | Ryshtun | G06F 3/0416 178/19.03 |
| 8,922,527 | B2 * | 12/2014 | Ryshtun | G06F 3/0416 345/174 |
| 9,310,923 | B2 * | 4/2016 | Krah | G06F 3/0416 |
| 9,690,399 | B2 * | 6/2017 | Mao | G06F 3/03545 |

\* cited by examiner

*Primary Examiner* — Vijay Shankar
(74) *Attorney, Agent, or Firm* — Donald E. Stout; Stout, Uxa & Buyan, LLP

(57) ABSTRACT

A capacitive stylus and a touch control apparatus applying synchronized time difference signal transmitting method are disclosed. The capacitive styluses transmit data to a touch control apparatus via wireless communication modules respectively. A non-transitory computer-readable medium of the touch control apparatus storing instructions executable to perform a synchronized time difference signal transmitting method to synchronize time difference of the signal transmitting of the capacitive styluses.

9 Claims, 5 Drawing Sheets

CAPACITIVE STYLUS AND TOUCH CONTROL APPARATUS APPLYING SYNCHRONIZED TIME DIFFERENCE SIGNAL TRANSMITTING METHOD

CROSS-REFERENCE TO RELATED APPLICATIONS

The entire contents of Taiwan Patent Application No. 105135147, filed on Oct. 28, 2016, from which this application claims priority, are expressly incorporated herein by reference.

1. FIELD OF THE INVENTION

The present invention relates to a signal transmitting method and a capacitive stylus as well as a touch input apparatus applying this method, and more particularly to a capacitive stylus and a touch input apparatus applying a synchronized time difference signal transmitting method.

2. DESCRIPTION OF THE PRIOR ART

FIG. 1 is a schematic view of a capacitive stylus applied upon a touch panel. As show in FIG. 1, a capacitive stylus 101 comprises a circuit board 104 with a capacitive stylus circuit, a battery 105 as the power source of the capacitive stylus 101 and a transmit electrode 106 transmitting high voltage electric field signals. A touch panel 100 has a capacitive detection array with a plurality of detection electrodes, wherein the detection electrodes comprise transmit electrodes (Tx) and receiving electrodes (Rx). The capacitive detection array of the touch panel 100 is drove by a touch control circuit on a touch control circuit board 102. The touch control circuit comprises a touch control integrated circuit chip. The capacitive stylus circuit on the circuit board 104 is configured to generate high voltage signals with specific frequencies. The high voltage signals are transmitted to the capacitive detection array of the touch panel 100 to form electric field signals via the transmit electrode 106 of the capacitive stylus 101. The touch control circuit on the touch control circuit board 102 and the touch panel 100 of a touch input apparatus such as tablet computers or smart phones receive the electric field signals from the transmit electrode 106 to calculate coordinates of the capacitive stylus 101 according to strengths of the electric field signals and a specific coordinate calculation algorithm.

When two or more capacitive styluses are used simultaneously, two or more capacitive styluses could transmit signals during overlapped periods so as to cause the touch panel unable to receive signals correctly and to identify the numbers and identities of signal sources or the capacitive styluses. In other words, there are indefinite differences among signal transmitting time sequences of two or more capacitive styluses. FIG. 2 is a schematic view of time slots of two capacitive stylus transmitting signals during overlapped periods upon a touch panel. As shown in FIG. 2, there is an indefinite difference between signal transmitting time sequences of two capacitive styluses. Initial time slots of signal transmitting of two capacitive styluses are beacon period. Beacon periods are from $T_{B0}$ to $T_{B1}$. During each beacon period, each capacitive stylus transmits an electric field signal with a frequency F1. During each pressure level period, each capacitive stylus transmits an electric field signal with a frequency F2. However, although both beacon periods of the capacitive styluses initiate at $T_{B0}$, there is an indefinite difference between the initiate times $T_{B0}$ of the capacitive styluses. When the time slots of the capacitive stylus partially overlap, such as beacon periods from $T_{B0}$ to $T_{B1}$ or pressure level periods, the touch panel would be unable to correctly identify the numbers and identities of signal sources or the capacitive styluses.

The invention provides a synchronized time difference signal transmitting method and a capacitive stylus applying this method to solve the problems set forth.

SUMMARY OF THE INVENTION

In one embodiment of the present invention, capacitive styluses and a touch input apparatus applying a synchronized time difference signal transmitting method are provided. Each of the capacitive styluses comprises a transmit electrode and a first wireless communication module. The touch input apparatus comprises a touch panel and a time difference synchronization module. The time difference synchronization module comprises an non-transitory computer readable medium and a second wireless communication module. The non-transitory computer readable medium stores executable computer readable instructions for performing the synchronized time difference signal transmitting method. The method comprises the following steps. First of all, in step (a), a step of resetting parameters of the time difference synchronization module is performed. Then in step (b), a step of receiving an initiate time parameter of a first capacitive stylus by the time difference synchronization module is performed. Next in step (c), a step of setting an initiate time of the first capacitive stylus as a standard value is performed. Then in step (d), a step of receiving a time parameter of a second capacitive stylus by the time difference synchronization module is performed. Next in step (e), a step of receiving a time difference parameter from the time difference synchronization module by the second capacitive stylus is performed. Then in step (f), a step of adjusting an initiate time parameter of the second capacitive stylus such that the difference between the initiate time parameters of the first and second capacitive styluses is the time difference parameter is performed. Next in step (g), a step of determining a limit of operation number of the capacitive styluses is performed. Then in step (h), a step of determining whether an additional capacitive stylus joins and transmits signals or not is performed. If an additional capacitive stylus joins and transmits signals, then steps (d) to (h) are repeated, and the time difference parameter is added to an initiate time parameter of the additional capacitive stylus.

In another embodiment of the present invention, a synchronized time difference signal transmitting method is provided. The method comprises the following steps. First of all, in step (a), a step of providing a touch input apparatus comprising a touch panel and a time difference synchronization module is performed, wherein the time difference synchronization module comprises an non-transitory computer readable medium and a first wireless communication module, the non-transitory computer readable medium stores executable computer readable instructions. Then in step (b), a step of providing at least two capacitive styluses upon the touch panel, each of the capacitive styluses comprising a transmit electrode and a second wireless communication module is performed, wherein the touch input apparatus and the capacitive styluses transmit time difference synchronization data through the first and second wireless communication modules respectively. Next in step (c), a step of resetting parameters of the time difference synchronization module is performed. Then in step (d), a step of receiving an initiate time parameter of a first capacitive stylus by the time difference synchronization module is performed. Next in step (e), a step of setting an initiate time of the first capacitive stylus as a standard value is performed. Then in step (f), a step of receiving a time parameter of a second capacitive stylus by the time difference synchronization module is performed. Next in step (g), a step of receiving a time difference parameter from the time difference synchronization module by the second capacitive stylus is performed. Then in step (h), a step of adjusting an initiate time parameter of the second capacitive stylus such that the difference between the initiate time parameters of the first and second capacitive styluses is the time difference parameter. Next in step (i), a step of determining a limit of operation number of the capacitive styluses is performed. Finally, in step (j), a step of determining whether an additional capacitive stylus joins and transmits signals or not is performed. If an additional capacitive stylus joins and transmits signals, then steps (f) to (j) are repeated, and the time difference parameter is added to an initiate time parameter of the additional capacitive stylus.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DESCRIPTION OF THE PREFERRED EMBODIMENT

Embodiment of this invention will be described in detail below. However, in addition to as described below, and this invention can be broadly implemented in the other cases the purpose and scope of this invention is not affected by the application of qualified, claim after its prevail. Furthermore, to provide a description more clear and easier to understand the invention, the pieces within the schema and not in accordance with their relative size of drawing, compared to certain dimensions to other scales have been exaggerated; details not related nor completely drawn in part in order to schematic simplicity.

Figure 1:
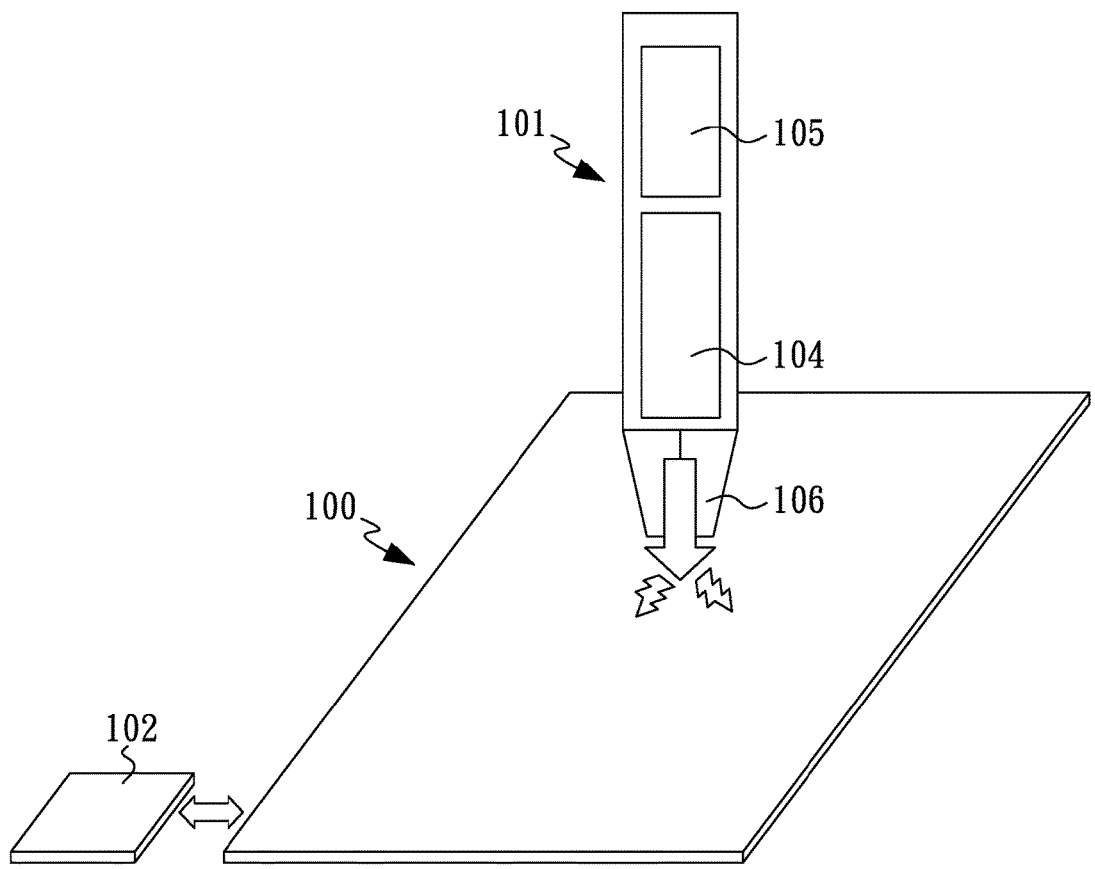
FIG. 1 is a schematic view of a capacitive stylus applied upon a touch panel.
Figure 2:
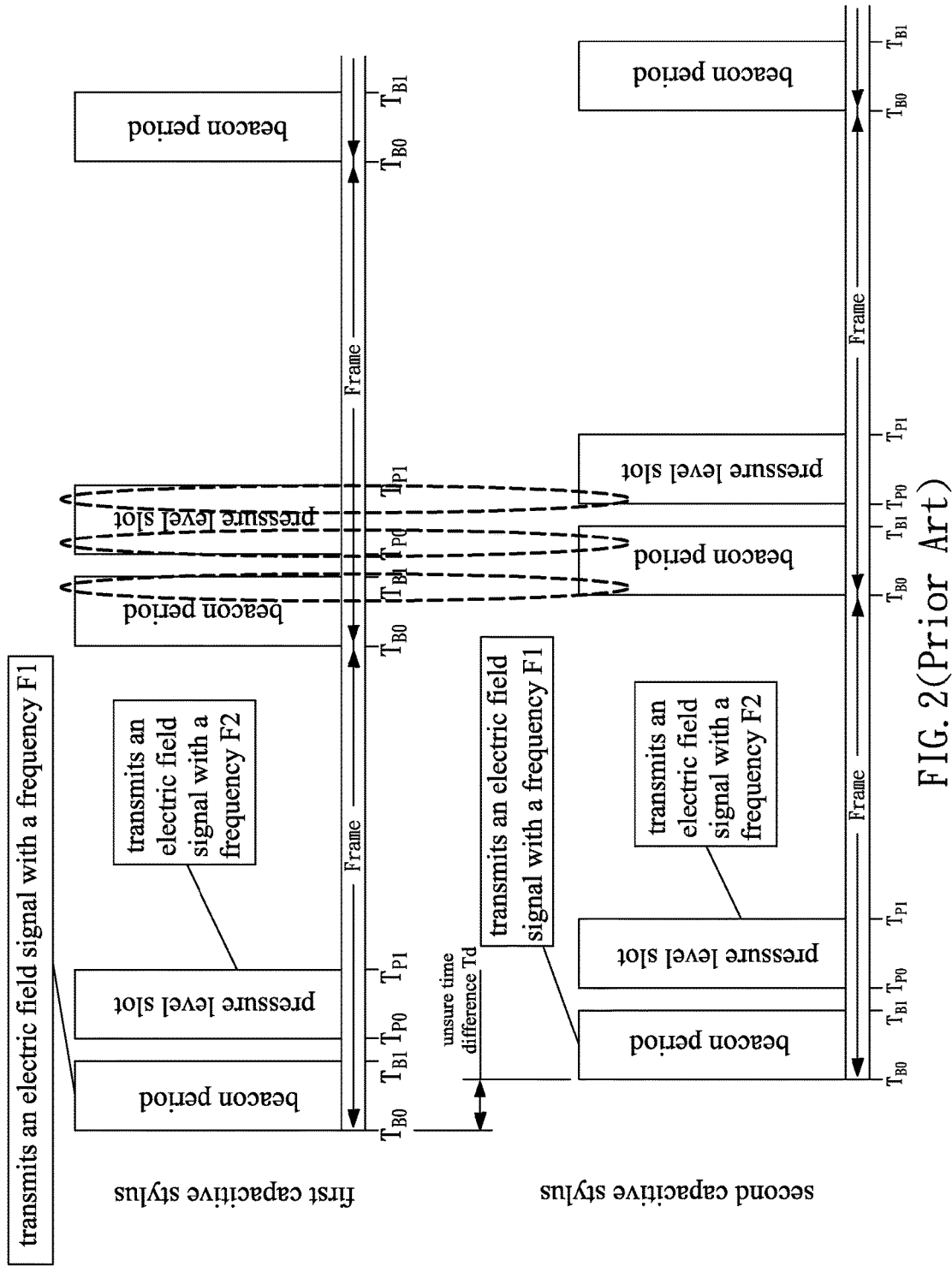
FIG. 2 is a schematic view of time slots of two capacitive stylus transmitting signals during overlapped periods upon a touch panel.
Figure 3:
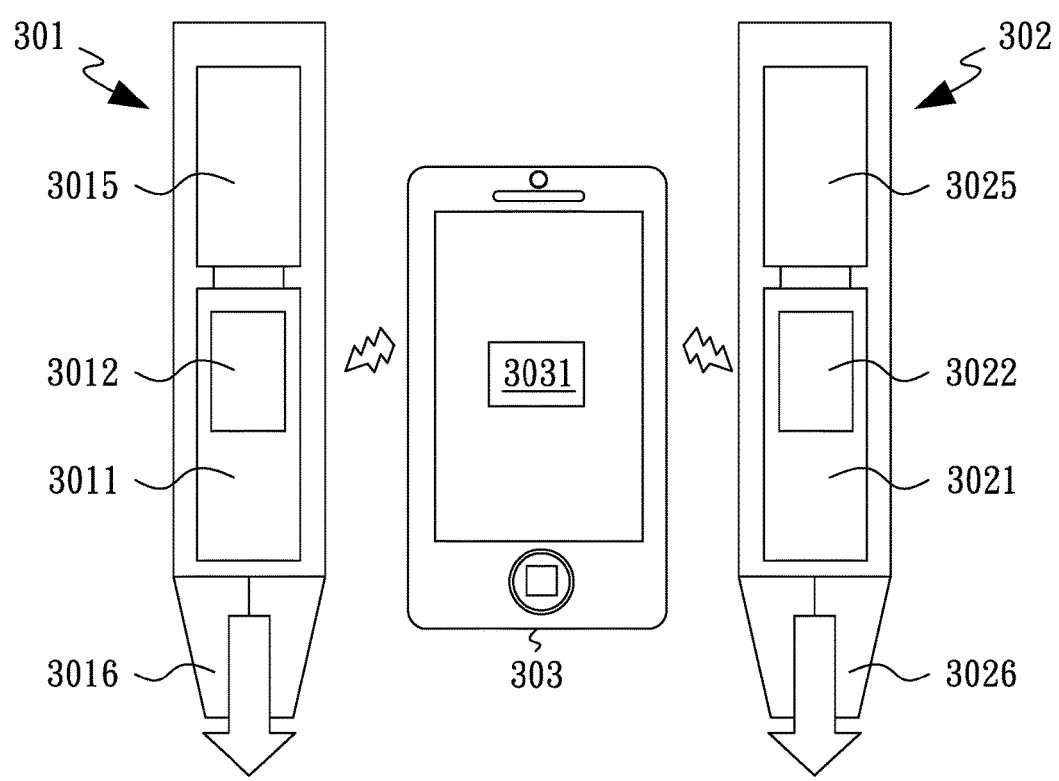
FIG. 3 is a schematic view of two capacitive styluses synchronizing time difference of the signal transmitting by a touch input apparatus according to one embodiment of the invention.

FIG. 3 is a schematic view of two capacitive styluses synchronizing time difference of the signal transmitting by a touch input apparatus according to one embodiment of the invention. In this embodiment, a touch input apparatus 303 comprises, but not limited to, a mobile communication apparatus with a touch panel. The touch input apparatus 303 comprises a time difference synchronization module 3031 and a touch panel. The time difference synchronization module 3031 comprises a wireless communication module or interface and an non-transitory computer-readable medium. The non-transitory computer-readable medium of the time difference synchronization module 3031 stores instructions executable to perform a synchronized time difference signal transmitting method. The non-transitory computer-readable medium comprises memory devices while the executable instructions comprise application programs. The instructions executable to perform a synchronized time difference signal transmitting method comprise time difference synchronization application programs.

Capacitive styluses 301 and 302 comprise circuit boards 3011 and 3021 with capacitive stylus circuits respectively, wireless communication modules 3012 and 3022 on the circuit boards 3011 and 3021, batteries 3015 and 3025 as the power sources of the capacitive styluses 301 and 302, and transmit electrodes 3016 and 3026 transmitting electric field signals. The wireless communication modules 3012 and 3022 comprise, but not limited to, Bluetooth wireless communication modules. The circuit boards 3011 and 3021 of the capacitive styluses 301 and 302 are configured to generate high voltage signals with specific frequencies. The high voltage signals are transmitted to the capacitive detection array of the touch panel of the touch input apparatus 303 via the transmit electrodes 3016 and 3026.

The touch input apparatus 303 has a wireless communication module or interface with a communication protocol the same with the wireless communication modules 3012 and 3022. The wireless communication module of the touch input apparatus 303 comprises, but not limited to, a Bluetooth wireless communication module. The wireless communication module or interface of the touch input apparatus 303 receives signals from the wireless communication modules 3012 and 3022 of the capacitive styluses 301 and 302 so that the capacitive styluses 301 and 302 transmit parameters to the touch input apparatus 303 respectively. The parameters or data transmitted between the touch input apparatus 303 and the wireless communication modules 3012 and 3022 of the capacitive styluses 301 and 302 comprise identification codes of the capacitive styluses 301 and 302, pairing parameters, initiate time parameters, predetermined initiate time parameters, signal frequencies F1 and F2 of the capacitive styluses 301 and 302 respectively, code names of the capacitive styluses 301 and 302, a writing sequence of the capacitive styluses 301 and 302 set by time difference synchronization application programs and a new time difference parameter (Td), etc. The time difference synchronization application programs transmits a time difference synchronization signal to the wireless communication modules 3012 and 3022 of the capacitive styluses 301 and 302 via the wireless communication module or interface of the touch input apparatus 303 so that the capacitive styluses 301 and 302 can transmit signals at different, not overlapped periods respectively. Therefore, the objective of a plurality of capacitive styluses transmitting signals at non-overlapped periods can be achieved and thus a touch panel would correctly receive signals from every capacitive stylus and multiple capacitive styluses can be operated upon the touch panel simultaneously.

Figure 4:
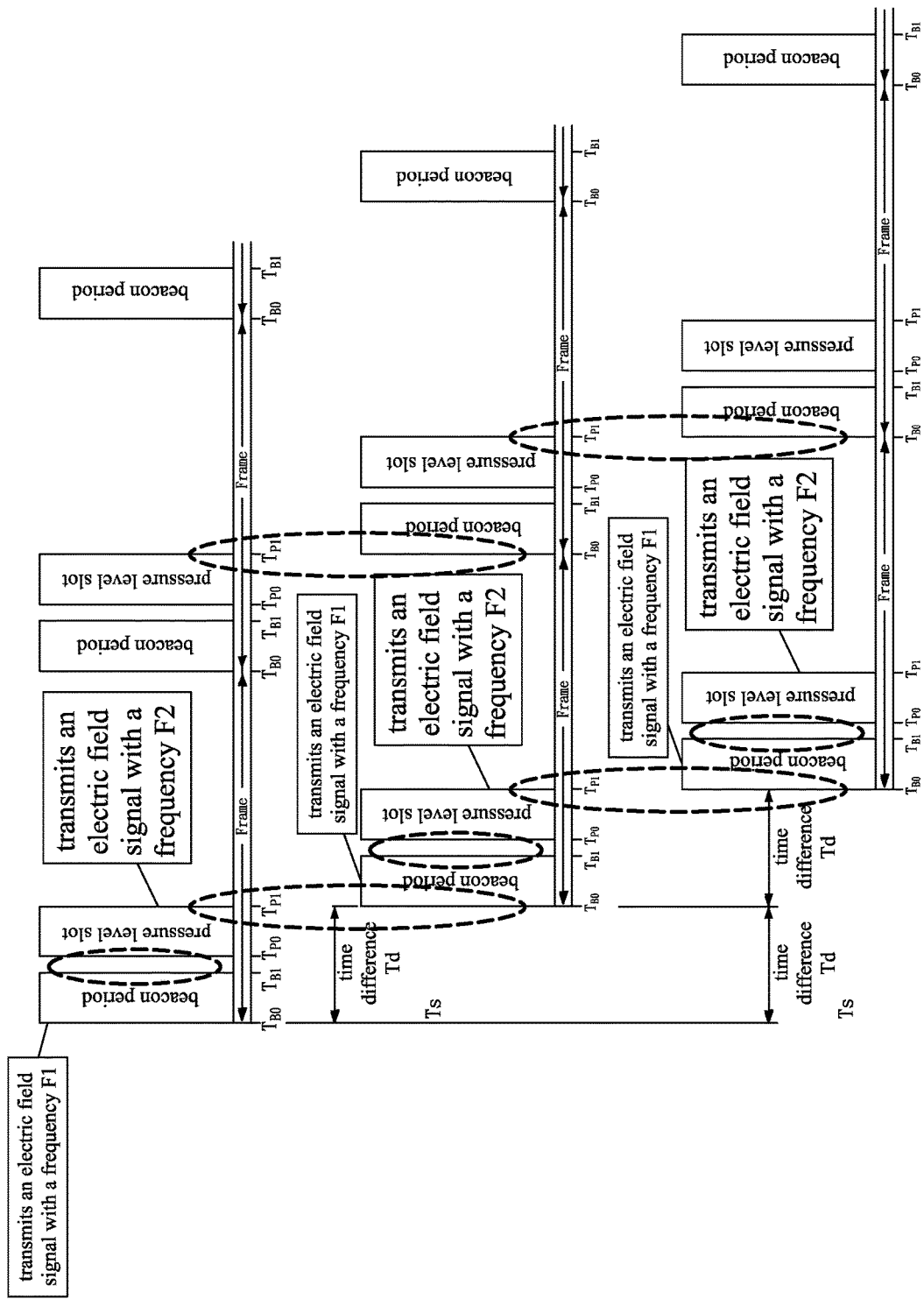
FIG. 4 is a schematic view of time slots of synchronized time difference signal transmitting of multiple capacitive styluses according to one embodiment of the invention.

FIG. 4 is a schematic view of time slots of synchronized time difference signal transmitting of multiple capacitive styluses according to one embodiment of the invention. As show in FIG. 4, there are time differences Td among signal transmitting of three capacitive styluses. Initial time slots of three capacitive styluses are beacon periods. Each beacon period is from $T_{B0}$ to $T_{B1}$. During each beacon period, each transmit electrode of each capacitive stylus transmits an electric field signal with a frequency F1. Then during a pressure level period, each transmit electrode of each capacitive stylus transmits an electric field signal with a frequency F2. However, initiate times $T_{B0}$ of three capacitive styluses are different, and there is a time difference Td between two initiate times $T_{B0}$ of the first and second capacitive styluses in sequence, and there is another time difference Td between two initiate times $T_{B0}$ of the second and third capacitive styluses. Thus the time difference Td allows the initiate time $T_{B0}$ of the beacon period of the second capacitive stylus later than the end time $T_{P1}$ of the pressure level period of the first capacitive stylus, and the initiate time $T_{B0}$ of the beacon period of the third capacitive stylus later than the end time $T_{P1}$ of the pressure level period of the second capacitive stylus so as to avoid the partial overlapping between the beacon period and the pressure level period of different capacitive styluses which would render the touch panel unable to correctly identify the numbers and identities of signal sources or the capacitive styluses. That is, the time difference between the first and second capacitive styluses transmitting electric field signals with a frequency F1 is Td, while the time difference between the second and third capacitive styluses transmitting electric field signals with a frequency F1 is also Td. The time difference between the first and third capacitive styluses transmitting electric field signals with a frequency F1 is 2Td.

Synchronizing signal transmitting of multiple capacitive styluses at different period allows a touch panel to correctly receive signals and identify the number and identities of signal sources or the capacitive styluses. Each of the capacitive styluses maintains the signal transmitting mode and the frequency of electric field signal while a specific time difference Td or time differences (a multiple of Td) of signal transmitting of two capacitive styluses is maintained.

Figure 5:
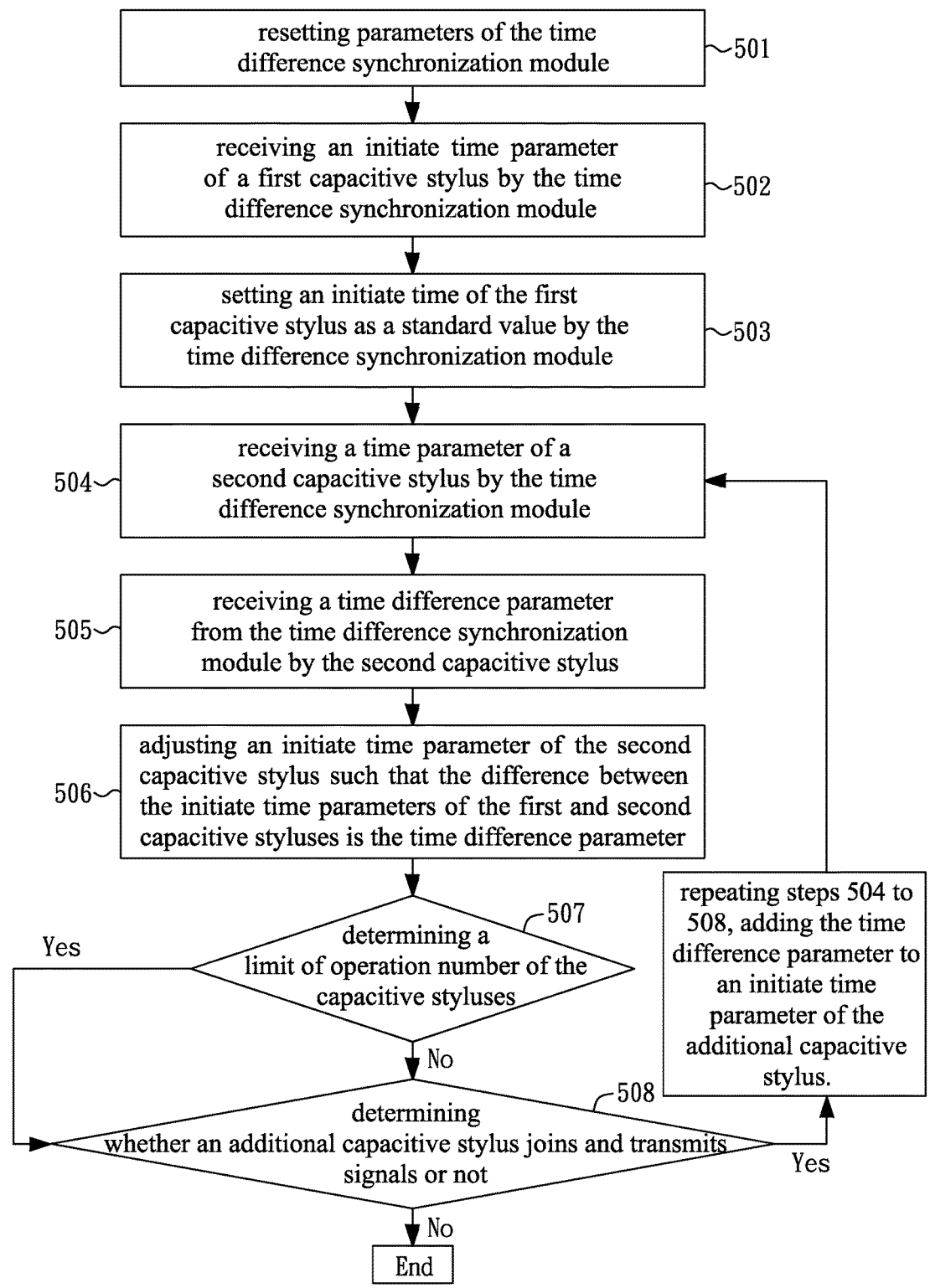
FIG. 5 is a flow chart of a synchronized time difference signal transmitting method according to one embodiment of the invention.

FIG. 5 is a flow chart of a synchronized time difference signal transmitting method according to one embodiment of the invention. A touch input apparatus which performs the synchronized time difference signal transmitting method comprises a touch panel and a time difference synchronization module. The time difference synchronization module comprises a first wireless communication module and an non-transitory computer-readable medium. The non-transitory computer-readable medium stores executable instructions. Each capacitive stylus upon the touch panel comprises a second wireless communication module and a transmit electrode. The touch input apparatus and the capacitive styluses transmit time difference synchronization data through the first and second wireless communication modules respectively. The synchronized time difference signal transmitting method can be performed by time difference synchronization application programs stored in storage mediums of the touch input apparatus and the capacitive styluses. The synchronized time difference signal transmitting method comprises the following steps. First of all, in step 501, a step of resetting parameters of the time difference synchronization module is performed. Then in step 502, a step of receiving an initiate time parameter of a first capacitive stylus by the time difference synchronization module is performed. Next in step 503, a first step of setting an initiate time of the first capacitive stylus as a standard value is performed. Then in step 504, a step of receiving a time parameter of a second capacitive stylus by the time difference synchronization module is performed. Next in step 505, a step of receiving a time difference parameter Td from the time difference synchronization module by the second capacitive stylus is performed. Then in step 506, a step of adjusting an initiate time parameter of the second capacitive stylus is performed such that the difference between the initiate time parameters of the first and second capacitive styluses is the time difference parameter Td. Next in step 507, a step of determining a limit of operation number of the capacitive styluses is performed. Then in step 508, a step of determining whether an additional capacitive stylus joins and transmits signals or not is performed. If an additional capacitive stylus joins and transmits signals, then steps 504 to 508 are repeated, and the time difference parameter Td is added to an initiate time parameter of the additional capacitive stylus.

Although specific embodiments have been illustrated and described, it will be appreciated by those skilled in the art that various modifications may be made without departing from the scope of the present invention, which is intended to be limited solely by the appended claims.

What is claimed is:

1. A synchronized time difference signal transmitting method, comprising:
    (a) providing a touch input apparatus comprising a touch panel and a time difference synchronization module, wherein the time difference synchronization module comprises an non-transitory computer readable medium and a first wireless communication module, the non-transitory computer readable medium stores executable computer readable instructions;
    (b) providing at least two capacitive styluses upon the touch panel, each of the capacitive styluses comprising a transmit electrode and a second wireless communication module, wherein the touch input apparatus and the capacitive styluses transmit time difference synchronization data through the first and second wireless communication modules respectively;
    (c) resetting parameters of the time difference synchronization module;
    (d) receiving an initiate time parameter of a first capacitive stylus by the time difference synchronization module;
    (e) setting an initiate time of the first capacitive stylus as a standard value;
    (f) receiving a time parameter of a second capacitive stylus by the time difference synchronization module;
    (g) receiving a time difference parameter from the time difference synchronization module by the second capacitive stylus;
    (h) adjusting an initiate time parameter of the second capacitive stylus such that the difference between the initiate time parameters of the first and second capacitive styluses is the time difference parameter;
    (i) determining a limit of operation number of the capacitive styluses; and
    (j) determining whether an additional capacitive stylus joins and transmits signals or not;
    wherein the first and second wireless communication modules comprise Bluetooth wireless communication modules.

2. The method according to claim 1, wherein if an additional capacitive stylus joins and transmits signals, then steps (f) to (j) are repeated, and the time difference parameter is added to an initiate time parameter of the additional capacitive stylus.

3. The method according to claim 1, wherein the time difference synchronization data comprise identification codes of the capacitive styluses, pairing parameters, initiate time parameters, predetermined initiate time parameters, signal frequency of the capacitive styluses, code names of the capacitive styluses, a writing sequence of the capacitive styluses and a new time difference parameter.

4. The method according to claim 1, wherein the executable computer readable instructions comprise time difference synchronization application programs.

5. Capacitive styluses and a touch input apparatus applying a synchronized time difference signal transmitting method, comprising:

at least two capacitive styluses, each of the capacitive styluses comprising a transmit electrode and a first wireless communication module; and a touch input apparatus comprising a touch panel and a time difference synchronization module, wherein the time difference synchronization module comprises an non-transitory computer readable medium and a second wireless communication module, the non-transitory computer readable medium stores executable computer readable instructions for performing the synchronized time difference signal transmitting method, comprising:

(a) resetting parameters of the time difference synchronization module;

(b) receiving an initiate time parameter of a first capacitive stylus by the time difference synchronization module;

(c) setting an initiate time of the first capacitive stylus as a standard value;

(d) receiving a time parameter of a second capacitive stylus by the time difference synchronization module;

(e) receiving a time difference parameter from the time difference synchronization module by the second capacitive stylus; and (f) adjusting an initiate time parameter of the second capacitive stylus such that the difference between the initiate time parameters of the first and second capacitive styluses is the time difference parameter;

wherein the first and second wireless communication modules comprise Bluetooth wireless communication modules.

6. The capacitive styluses and the touch input apparatus according to claim 5, wherein the method further comprising:

(g) determining a limit of operation number of the capacitive styluses; and (h) determining whether an additional capacitive stylus joins and transmits signals or not.

7. The capacitive styluses and the touch input apparatus according to claim 6, wherein if an additional capacitive stylus joins and transmits signals, then steps (d) to (h) are repeated, and the time difference parameter is added to an initiate time parameter of the additional capacitive stylus.

8. The capacitive styluses and the touch input apparatus according to claim 5, wherein data transmitted between the first and second wireless communication modules comprise identification codes of the capacitive styluses, pairing parameters, initiate time parameters, predetermined initiate time parameters, signal frequency of the capacitive styluses, code names of the capacitive styluses, a writing sequence of the capacitive styluses and a new time difference parameter.

9. The capacitive styluses and the touch input apparatus according to claim 5, wherein the executable computer readable instructions comprise time difference synchronization application programs.

* * * * *